United States Patent [19]

Zega

[11] 4,352,006
[45] Sep. 28, 1982

[54] HEATED MIRROR, DESIGNED IN PARTICULAR TO CONSTITUTE AN EXTERNAL REARVIEW MIRROR ELEMENT FOR A VEHICLE

[75] Inventor: Bogdan Zega, Geneva, Switzerland

[73] Assignee: Societa Italiana Vetro-SIV-S.p.A., Italy

[21] Appl. No.: 233,602

[22] PCT Filed: Jun. 3, 1980

[86] PCT No.: PCT/CH80/00067
§ 371 Date: Feb. 7, 1981
§ 102(e) Date: Feb. 4, 1981

[87] PCT Pub. No.: WO80/02678
PCT Pub. Date: Dec. 11, 1980

[30] Foreign Application Priority Data

Jun. 7, 1979 [CH] Switzerland .................. 5303/79

[51] Int. Cl.³ .............................................. H05B 1/00
[52] U.S. Cl. .................. 219/219; 219/543; 350/164; 350/1.7
[58] Field of Search .............. 219/219, 203, 406, 522, 219/543; 350/1.6, 1.7, 61, 164, 288, 307; 428/412; 126/200

[56] References Cited

U.S. PATENT DOCUMENTS

| | | | |
|---|---|---|---|
| 2,564,836 | 8/1951 | Elsenheimer | 219/219 |
| 2,648,753 | 8/1953 | Lytle | 219/543 X |
| 3,624,347 | 11/1971 | Todd et al. | 219/219 |
| 3,853,386 | 12/1974 | Ritter et al. | 350/164 |
| 4,017,661 | 4/1977 | Gillery | 428/412 |
| 4,048,978 | 9/1977 | Plumat et al. | 126/200 |
| 4,147,409 | 4/1979 | Apfel | 350/164 |
| 4,189,205 | 2/1980 | Vandeher | 350/1.7 |
| 4,251,316 | 2/1981 | Smallgone | 219/219 X |

FOREIGN PATENT DOCUMENTS

| | | | |
|---|---|---|---|
| 2028978 | 6/1970 | Fed. Rep. of Germany . | |
| 1391425 | 4/1975 | United Kingdom | 219/219 |

Primary Examiner—Volodymyr Y. Mayewsky
Attorney, Agent, or Firm—Finnegan, Henderson, Farabow, Garrett & Dunner

[57] ABSTRACT

A heated mirror includes a transparent substrate with a reflective coating covering at least one of the substrate surfaces. The reflective coating includes a stack of transparent, non-metallic layers which have alternately high and low indices of refraction. At least one of the layers has a high index of refraction and is constructed from electrically conductive, transparent, non-metallic material through which electric current flows to heat the mirror. The remaining layers of the coating are constructed of transparent, dielectric material.

9 Claims, 4 Drawing Figures

HEATED MIRROR, DESIGNED IN PARTICULAR TO CONSTITUTE AN EXTERNAL REARVIEW MIRROR ELEMENT FOR A VEHICLE

TECHNICAL FIELD

The present invention relates to a heated mirror, designed in particular to constitute an external rearview mirror element for a vehicle.

PRIOR ART

The constant improvement of comfortable and safe driving of vehicles requires the continued improvement of all of the accessories of these vehicles, amongst which the external rearview mirror is relatively important.

It is known that the mirrors which make up these external rearview elements for vehicles are subjected to particularly severe conditions of use. These mirrors are in the first instance particularly exposed to corrosion as they are designed to be used for years under severe atmospheric conditions, to which other factors may be added such as the presence of salt on slippery road surfaces in winter, repeated thermal shocks resulting from wide temperature variations, mechanical damage resulting from impact with grains of sand etc. The protective measures which are usually applied to known mirrors constituted by metallised (generally slivered) glass substrates have proved to be quite inadequate as protection against this corrosion.

It is also known that the "reflective capacity" of external rearview mirrors may often be impaired by unfavourable atmospheric conditions causing the complete "misting" of these mirrors in the case of very humid atmospheres or the "icing up" of these mirrors in the case of temperatures lower than 0° C. The measures applied most frequently at present to demist or defrost these mirrors consist of simple manual cleaning, which is obviously not a very practical solution, in particular when the vehicle is in traffic.

For this reason it has already been proposed to provide known rearview mirrors with heating elements in order to enable the automation of these demisting or defrosting operations. The German Patent Application No. 2 028 978 therefore proposes to provide a heated rearview mirror in which the heating element is constituted by a metallic or semiconductor layer covering the surface of the mirror opposite to the surface provided with the reflecting layer. The German Patent Application No. 2 710 588 further proposes a rearview mirror in which the heating element is constituted by a resistive layer which is applied directly to the rear silvered surface of the mirror. In the two embodiments mentioned above, the heating and reflecting operations are however ensured whatever the position of the heating layer with respect to the reflecting layer by two entirely separate elements which only serves to increase the manufacturing complexity of these rearview mirrors. The British Patent Specification No. 1 387 436 proposes a simplified rearview mirror in which the heating element is constituted by a resistive nickel-chromium alloy layer which is designed to act simultaneously as the reflecting layer, however the reflecting power of a nickle-chromium alloy layer of this type is much less than that of conventional reflecting layers. In all the embodiments mentioned above, the inevitable presence of metal layers does not enable a definitive solution of the problems of corrosion resistance.

It is also known that external rearview vehicle mirrors may under certain conditions cause the driver to suffer from a certain amount of visual discomfort, in particular when driving at twilight when the reflectivity of the mirrors may be completely inadequate, or when driving in complete darkness when the reflection of the headlights of vehicles approaching from behind in the rearview mirrors may dazzle the driver. A certain number of solutions have been proposed up to now which enable these causes of visual discomfort to be remedied, in particular based on the use of multilayer dielectric mirrors which have the major advantage of improving reflectivity in the blue portion of the visible spectrum (improvement of visibility at twilight) whilst strongly attenuating reflectivity in the yellow portion of this spectrum (suppression of the risk of being dazzled). However, it has not as yet been proposed to improve such mirrors provided with multilayer dielectric layers so as to additionally provide them with a heating capacity suitable to ensure that they are demisted or defrosted when necessary.

DESCRIPTION OF THE INVENTION

The present invention aims to remedy at least partially the above-mentioned drawbacks by providing a high performance mirror designed to provide the user with the maximum visual comfort under widely varying conditions of use, which mirror also has an excellent resistance to corrosion.

For this purpose, the present invention relates to a heated mirror, designed in particular to constitute an external rearview element for a vehicle, which mirror comprises a transparent substrate covered on one of its surfaces by a reflecting coating, the reflecting coating being constituted by a stack of transparent non-metallic layers having alternately a high refraction index and a low refraction index, characterised in that at least one of the said layers having a high refraction index is constituted by an electrically conductive non-metallic transparent material, the remaining layers also being made of transparent dielectric materials, the said electrically conductive non-metallic layer being designed to be supplied with electrical current to constitute a heating layer for the said mirror.

It can therefore be seen that one of the essential characteristic features of the heated mirror defined above consists in the use of a known type of mirror comprising a transparent substrate covered with a multilayer reflective coating constituted by a stack of transparent dielectric layers having an alternating high and low refraction index, in which at least one of the transparent dielectric layers having a high refraction index is replaced by an electrically conductive transparent layer so as to act as a heating layer for the mirror (in order to demist or defrost this mirror when it is used as an external rearview element for a vehicle).

The above-mentioned replacement of at least one dielectric layer of the stack by an electrically conductive layer may be applied either to a single dielectric layer having a high index of refraction, or to several of these dielectric layers having high refraction indices, or even to all of these layers. The electrically conductive layer(s) substituted in this way must of course be selected so as to have optical characteristics which are compatible with those of the other dielectric layers of the reflecting stack in order to be able to continue to exert, in addition to their above-mentioned electrical function as a heating layer, their normal optical function enabling the achievement in cooperation with the other layers of a high reflective power in the entirety of the stack. These electrically conductive layers must therefore be constituted in particular by materials which are non-metallic, in order to absorb as little light as possible. As non-metallic materials which satisfy the requirements it is possible to envisage the use of electrically conductive non-metallic transparent materials such as indium oxide, tin oxide, the mixed oxide of tin and indium, the mixed oxide of tin and antimony, cadmium stannate etc.

The other dielectric layers of the reflecting stack may be constituted by any transparent dielectric material known in the prior art. The dielectric layers having a low index of refraction may be made for example from transparent dielectric materials such as $SiO_2$, borosilicate glass, cryolite, $MgF_2$ etc., whilst the other dielectric layers having a high index of refraction may be made from transparent dielectric materials such as $TiO_2$, ZnS etc.

The multilayer reflective and heating covering constituting the mirror of the present invention may be equally applied to the front surface of the transparent substrate used as a support for this covering, i.e. on the surface designed to be located opposite the incident luminous rays, or to the rear surface of this transparent substrate, i.e. the surface opposite to this front surface.

The rear surface of the mirror (whether coated or not with this multilayer reflecting covering) is in either case advantageously provided with an additional opaque layer designed to absorb the portion of the incident light which is not reflected by the multilayer reflective coating. An absorbent layer of this type may however be applied, as a variant, to the internal surface of the armature in general designed to support the mirror, instead of being applied directly to the rear surface of the mirror as mentioned above.

The multilayer reflective and heating coating of the present invention may, in addition, be advantageously constituted by a stack comprising an odd number of layers, this stack being arranged on the transparent substrate in such a way that the first of the layers designed to be struck by the incident light (and therefore also the last of these layers) is a layer having a high refraction index.

The optical thickness of each of the layers of the stack may in addition be advantageously selected so that it is substantially equal to a quarter of the average wavelength of the spectral portion of incident light which it is preferably desired to reflect, or to an odd multiple of a quarter of this average wavelength. This average wavelength may therefore, in a particularly advantageous manner and in particular in the case in which the heated mirror of the invention is designed to constitute an external rearview element for a vehicle, be selected in the blue portion of the visible spectrum of the incident light, so as to provide this heated mirror with a selective reflective power which is much greater in the blue portion than in the yellow portion (a particularly advantageous arrangement enabling the avoidance of being dazzled by the headlights of vehicles approaching from behind).

The use of a stack comprising an odd number of "quarter wave" layers as a reflective coating constitutes a known advantageous arrangement which enables this stack to be provided with a particularly high selective reflective power, the maximum reflective power being centred on the average wavelength selected for the determination of the optical thickness of the various layers of the stack (an arrangement acting in such a way that at least the first successive partial reflections at the various interfaces of the stack are in phase with one another at their discharge from the stack). The selection of an average wavelength which is offset with respect to the median wavelength of the visible spectrum therefore enables a selective reflective power to be obtained for the stack which then enables any desired portion of the visible spectrum to be "cut" (the selection of an average wavelength located in the blue portion of the visible spectrum therefore enabling, for example, as mentioned above, the yellow portion of this spectrum to be "cut").

The "optical thickness" of a transparent layer may be defined as being equal to the product of the geometrical thickness of this layer multiplied by its index of refraction. As the electrically conductive transparent material constituting the heating layer(s) of the mirror of the invention is a material which generally has strong characteristics of dispersion (dispersion being the property shown by certain materials having an index of refraction which is variable with the wavelength used), this additional dispersion factor should also be taken into account in carrying out the exact determination of the geometrical thickness required for the heating layer(s) as a function of the selected wavelength.

The presence within the reflecting stack of one or a plurality of conducting layers designed to act as heating layers obviously requires the provision of means enabling the heating layer(s) to be electrically connected to a suitable electrical supply source. Such connection means may be constituted by any known means in the prior art. It is therefore possible, for example, to envisage, in the case in which the stack contains a single external heating layer, the application of electrical contact strips (such as silver strips) in a direct manner on two of the opposite edges of the external surface of this heating layer. It is also possible to envisage, in particular in the case in which the stack comprises several heating layers, the use of a further advantageous arrangement consisting in causing two opposite portions of the heating layers to project over the dielectric layers and in applying electrical contact strips to these opposite projecting portions.

The opposite portions or edges of the heating layer or layers designed in this way to receive the electrical contact strips, as defined above, may have widely varying shapes according to the shape of the mirror used. In the case of a rectangular mirror, the opposite portions or edges are parallel, and in the case of an oval mirror etc. the opposite portions or edges each extend over the majority of one of the two semi-peripheries of the mirror (whilst remaining completely separate from one another from the electrical point of view).

The heated mirror of the invention should be such, in particular in the case in which it is designed to constitute an external rearview mirror for a vehicle, as to provide a heating capacity able to dissipate an electrical power in the range of 0.02 to 0.1 Watt per $cm^2$ of mirror. As the longitudinal dimensions of the rearview mirror and the electrical characteristics of the available supply source are generally fixed, the heating capacities required may be satisfied by selecting in a suitable manner the exact number of heating layers required to equip the mirror, and/or the material constituting these layers (selection of suitable resistivity), and/or the thickness of these layers (selection of the suitable odd multiple of a quarter of the average wavelength chosen).

The different layers constituting the reflecting and heating stack of the mirror of the invention may be deposited by means of any known physical or chemical deposition methods, such as vacuum evaporation and condensation methods, reactive or non-reactive cathode sputtering methods with possible excitation by radiofrequency and/or with the possible use of a flat magnetron, ion deposition methods (reactive or non-reactive ion plating with possible excitation by radiofrequency and/or with the possible use of a flat magnetron), deposition methods by gaseous phase chemical reaction (CVD) etc. The heating layer(s) of the mirror may for example be advantageously deposited with a reactive sputtering method using a flat magnetron as described in the Swiss Patent Application No. 6237/76 in the name of the applicant, whilst the other dielectric layers may be advantageously deposited by a non-reactive sputtering method using a flat magnetron and radiofrequency excitation.

All the deposits may be carried out in a single operation within a single production unit containing the different magnetrons.

The heated mirror of the invention has the major advantage of being a particularly simple arrangement (a multilayer coating able to carry out itself a double optical and electrical function), which is however capable, despite this simplification, of providing the user with maximum visual comfort. A heated mirror of this type has the additional advantage of being extremely corrosion resistant, as the various layers constituting the reflective and heating coating are made of non-metallic materials.

The heated mirror of the present invention is in particular designed to be used as a rearview external element for vehicles, such as touring vehicles and heavy goods vehicles.

BRIEF DESCRIPTION OF THE DRAWINGS

The attached drawings show diagrammatically and by way of example several embodiments of the heated mirror of the present invention.

BEST METHODS OF EMBODYING THE INVENTION

Figure 1:
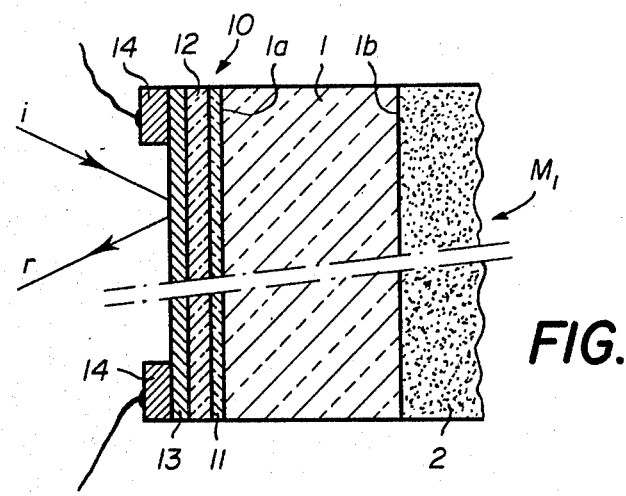
FIG. 1 is a cross-section through a first embodiment.

FIG. 1 shows a first embodiment of the heated mirror of the invention provided on its front surface with a trilayer reflective coating comprising a single heating layer. The mirror $M_1$ shown in FIG. 1 comprises a substrate 1 which is plane and parallel and made of glass and which is coated on its rear surface $1b$ with an opaque layer 2 constituted by a black varnish and on its front surface $1a$ with a trilayer coating 10. This trilayer coating 10 comprises a first layer 11 disposed directly on the front surface $1a$ and made of a transparent dielectric material having a high index of refraction (such as $TiO_2$); a second layer 12 disposed on the first layer 11 and made of a transparent dielectric material having a low index of refraction (such as $SiO_2$); and a third layer 13 disposed on the second layer 12 and made of an electrically conductive transparent material having a high index of refraction (such as the mixed oxide of indium and tin).

The optical thicknesses of the various layers 11, 12 and 13 are selected such that they are equal to a quarter of a wavelength selected in the blue portion of the visible spectrum (therefore the second layer 12 having a low index of refraction has a substantially greater thickness than that of the first and second layers 11 and 13 having a high index of refraction). The electrically conductive external layer 13 is also covered on two of its opposite edges (advantageously the edges extending in the longitudinal direction of the mirror) by silver contact strips 14 designed to be connected to a suitable electrical supply source.

The operation of the heated mirror described above may therefore be readily understood. The external heating layer 13 may at any desired moment be connected to the available electrical supply source in order to demist and/or defrost the mirror $M_1$. Once the mirror $M_1$ has been correctly demisted and/or defrosted, the trilayer coating 10 taken in its entirety may then carry out its optical function in respect of the incident light "i" by reflecting in a preferred manner the blue portion of this light (reflected beam "r" in the drawing) and by absorbing the major part of the yellow portion of this light (which is then absorbed by the opaque layer 2) thus providing the user with the maximum visual comfort.

Figure 2:
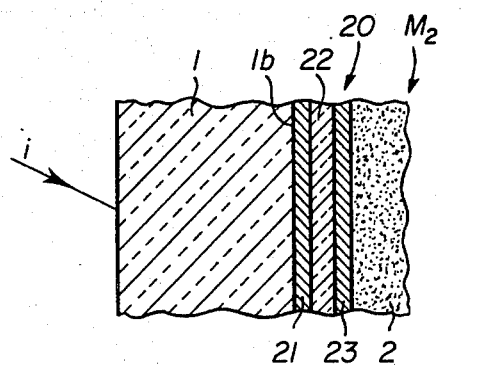
FIG. 2 is a partial cross-section through a second embodiment.

FIG. 2 illustrates a second embodiment of the heated mirror of the invention provided on its rear surface with a trilayer reflective coating comprising a double heating layer (those elements which are identical in FIG. 1 have the same reference numerals). The mirror $M_2$ shown in FIG. 2 has a transparent substrate 1 covered successively on its rear surface $1b$ with a trilayer coating 20 and an opaque layer 2. This trilayer coating 20 comprises a first layer 21 disposed directly on the rear surface $1b$ and made of an electrically conductive transparent material having a high index of refraction; a second layer 22 disposed on the first layer 21 and made of a transparent dielectric material having a low index of refraction; and a third layer 23 immediately adjacent to the opaque layer 2 and also made of an electrically conductive transparent material having a high index of refraction. The two electrically conductive layers 21 and 23 which are designed to be connected to a suitable electrical supply source thus constitute a double heating layer for the mirror $M_2$, the trilayer coating 20 taken in its entirety being designed to carry out its normal reflecting function.

Figure 3:
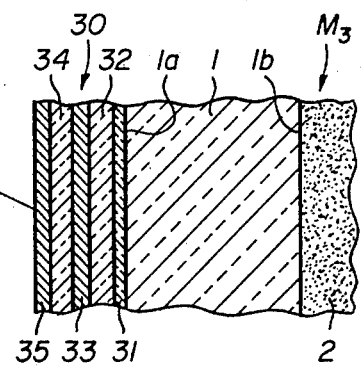
FIG. 3 is a section similar to that of FIG. 1, showing a third embodiment.

FIG. 3 illustrates a third embodiment of the heated mirror of the invention provided on its front surface with a "five layer" reflective coating comprising a double heating layer. The mirror $M_3$ shown in FIG. 3 comprises a transparent substrate 1 coated on its rear surface with the opaque layer 2 and on its front surface $1a$ with a "five layer" coating 30. This coating comprises a first layer 31 disposed directly on the front surface $1a$ and made of a transparent dielectric material having a high index of refraction; a second layer 32 disposed on the first layer 31 and made of a transparent dielectric material having a low index of refraction; a third layer 33 disposed on the second layer 32 and made of an electrically conductive transparent material having a high index of refraction; a fourth layer 34 disposed on the third layer 33 and also made of a transparent dielectric material having a low index; and a fifth layer 35 disposed on the fourth layer 34 and also made of a conductive transparent material having a high index. The conductive layers 33 and 35 thus constitute a double heating layer for the mirror $M_3$, the "five layer" coating 30 taken in its entirety being designed to carry out its normal reflecting function (the total reflectivity being higher than before as a result of the greater number of layers).

EXAMPLE 1

A mirror identical to that of FIG. 1 was constructed, this mirror being designed to reflect preferably in the blue portion of the visible spectrum (selection of an average wavelength $\lambda_o$ substantially equal to 5000 Å). This mirror (40×20 cm) was provided on its front surface with a trilayer coating 10 comprising, respectively:

a first layer 11 of $TiO_2$ of 540 Å thickness (n=2.32), a second layer 12 of $SiO_2$ of 856 Å thickness (n=1.46), a third layer 13 of $(In_2O_3)_{0.9}(SnO_2)_{0.1}$ of 631 Å thickness (n=1.98 to 5000 Å).

On the longitudinal edges of the external surface of the conductive layer 13 there were in addition applied two contact strips 14 of silver having a length of 40 cm and located at 20 cm from one another.

Figure 4:
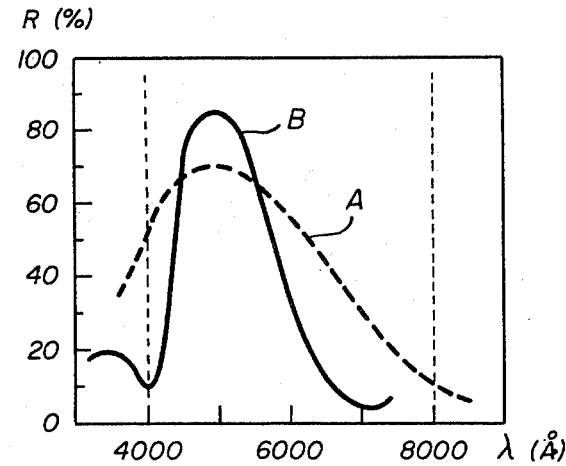
FIG. 4 is a diagram showing the optical characteristics of the mirror of the invention.

The trilayer reflective coating 10 constructed in this way had a reflectivity R whose variation as a function of the wavelength "λ" of the incident light is given by the curve A in FIG. 4, the maximum reflectivity being in the range of 70% (for λ=5000 A) and the average reflectivity in the visible spectrum being in the range of 38%.

The external heating layer 13 has in addition a resistance (measured between the two contact strips 14) in the range of 20Ω, which enables a power dissipation of 0.36 W/cm² when it is connected to a direct current source of 24 V.

EXAMPLE 2

A mirror similar to that of Example 1 was constructed, with the exception that the reflective and heating surfaces in this case comprises five layers instead of the previous three, i.e.:

a first layer and a third layer of $TiO_2$ of 540 Å of thickness (the first layer resting directly on on the transparent substrate), a second and a fourth layer of $SiO_2$ of 856 Å in thickness, and a fifth layer of $(In_2O_3)_{0.9}(SnO_2)_{0.1}$ of 631 Å in thickness (external heating layer).

The reflecting and heating coating constructed in this way had a reflectivity R whose variation as a function of the wavelength λ of the incident light is given by the curve B of FIG. 4 (reflectivity which is much greater than before and having a maximum in the range of 85%). The electrical characteristics of the external heating layer remained identical to those described in Example 1.

I claim:

1. A heated mirror comprising:

a transparent substrate;

a reflective coating covering at least one of the surfaces of said substrate, said reflective coating including a stack of transparent, non-metallic layers having alternately a high index of refraction and a low index of refraction, at least one of the layers having a high index of refraction being constructed of an electrically conductive, transparent, non-metallic material and the remaining layers of said stack being constructed of transparent, dielectric materials; and means for supplying an electrical current through said at least one electrically conductive layer to heat said mirror.

2. A heated mirror as claimed in claim 1, characterised in that a plurality of the layers having a high index of refraction are made of an electrically conductive transparent non-metallic material.

3. A heated mirror as claimed in claim 1, characterised in that all the layers having a high index of refraction in the stack are made of an electrically conductive transparent non-metallic material.

4. A heated mirror as claimed in any one of claims 1, 2 or 3, characterised in that the electrically conductive transparent non-metallic material is selected from the group consisting of indium oxide, tin oxide, the mixed oxide of tin and indium, the mixed oxide of indium and antimony, and cadmium stannate.

5. A heated mirror as claimed in claim 4, characterised in that the said electrically conductive transparent non-metallic material is preferably constituted by a mixed oxide of indium and tin.

6. A heated mirror as claimed in any one of claims 1, 2 or 3, characterised in that the number of the electrically conductive, transparent, non-metallic layers, and the electrical resistivity and the thickness of these layers are selected as a function of the longitudinal dimensions of the mirror and the characteristics of the electrical supply source available in such a way as to be able to dissipate an overall electrical power in the range of 0.02 to 0.1 Watts/cm².

7. A heated mirror as claimed in claim 1, characterised in that the stack constituting the reflective coating comprises an odd number of transparent non-metallic layers, the stack being arranged in such a way that the first layer struck by the incident light is a layer having a high index of refraction.

8. A heated mirror as claimed in claim 1, characterised in that the optical thickness of the various layers of the stack is selected so as to be substantially equal to a quarter of the average wavelength of the spectral portion of the incident light which is preferably to be reflected, or to an odd multiple of a quarter of this average wavelength.

9. A heated mirror as claimed in claim 8, characterised in that the said average wavelength is selected in the blue portion of the visible spectrum of the incident light in such a way as to provide the mirror with a selective reflective power which is much greater in the blue portion than in the yellow portion.

* * * * *